United States Patent
You et al.

(10) Patent No.: US 11,481,599 B2
(45) Date of Patent: Oct. 25, 2022

(54) UNDERSTANDING A QUERY INTENTION FOR MEDICAL ARTIFICIAL INTELLIGENCE SYSTEMS USING SEMI-SUPERVISED DEEP LEARNING

(71) Applicant: TENCENT AMERICA LLC, Palo Alto, CA (US)

(72) Inventors: Zeyu You, San Jose, CA (US); Tao Yang, Mountain View, CA (US); Yusheng Xie, Mountain View, CA (US); Shangqing Zhang, San Jose, CA (US); Min Tu, Cupertino, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 604 days.

(21) Appl. No.: 16/560,440

(22) Filed: Sep. 4, 2019

(65) Prior Publication Data

US 2021/0064957 A1   Mar. 4, 2021

(51) Int. Cl.
| | | |
|---|---|---|
| *G06F 16/903* | (2019.01) | |
| *G06K 9/62* | (2022.01) | |
| *G06F 40/30* | (2020.01) | |
| *G06N 3/04* | (2006.01) | |

(52) U.S. Cl.
CPC ............. *G06N 3/04* (2013.01); *G06F 16/903* (2019.01); *G06F 40/30* (2020.01); *G06K 9/6218* (2013.01)

(58) Field of Classification Search
CPC ......... G06N 3/04; G06F 16/903; G06F 40/30; G06K 9/6218
See application file for complete search history.

(56) References Cited

U.S. PATENT DOCUMENTS

| 5,608,623 A * | 3/1997 | Sata ................. G06F 40/55 704/4 |
|---|---|---|
| 9,015,093 B1 | 4/2015 | Commons |
| 10,347,244 B2 * | 7/2019 | Goel ................. G10L 15/26 |
| 11,222,627 B1 * | 1/2022 | Qian ................. G09B 19/06 |
| 2002/0135618 A1 | 9/2002 | Maes et al. |
| 2008/0103762 A1 * | 5/2008 | Kirshenbaum ......... G06F 40/30 704/10 |
| 2009/0248394 A1 | 10/2009 | Sarikaya et al. |
| 2015/0324655 A1 | 11/2015 | Chalasani et al. |
| 2017/0357716 A1 | 12/2017 | Bellegarda et al. |
| 2019/0087677 A1 | 3/2019 | Wolf et al. |
| 2020/0335095 A1 * | 10/2020 | Yuan ................. G10L 15/1815 |
| 2021/0020161 A1 * | 1/2021 | Gao ................. G10L 13/08 |

(Continued)

OTHER PUBLICATIONS

International Search Report dated Nov. 19, 2020 from the International Searching Authority in International Application No. PCT/US2020/045920.

(Continued)

*Primary Examiner* — Kevin Ky
(74) *Attorney, Agent, or Firm* — Sughrue Mion, PLLC

(57) ABSTRACT

Provided are a method and an apparatus for receiving a query including a sequence of words. The sequence of words is converted into a sequence of feature vectors. A semantic meaning of the sequence of words is generated using a bi-directional long-short term memory (LSTM). The LSTM is regularized using a Gaussian mixed model (GMM) based on the generated semantic meaning of the sequence of feature vectors.

18 Claims, 5 Drawing Sheets

(56) References Cited

U.S. PATENT DOCUMENTS

2021/0049327 A1* 2/2021 Hu ..................... G06F 40/284
2021/0064957 A1* 3/2021 You ..................... G06K 9/6226

OTHER PUBLICATIONS

Written Opinion dated Nov. 19, 2020 from the International Searching Authority in International Application No. PCT/US2020/045920.

* cited by examiner

US 11,481,599 B2

UNDERSTANDING A QUERY INTENTION FOR MEDICAL ARTIFICIAL INTELLIGENCE SYSTEMS USING SEMI-SUPERVISED DEEP LEARNING

BACKGROUND

Unlike other fields, and due to privacy and protection of patients, medical data is more limited and more difficult to obtain. In a medical chatbot system, understanding the customers' question or intention is of high importance. With a limited amount of labelled data samples, directly training a deep learning model for accurate query classification is impractical. The present disclosure utilizes both deep learning and semi-supervised learning to improve the generalization of a supervised task under a limited labeled data scenario.

Semi-supervised learning approaches vary. A common solution is using a generative approach to model joint distribution between data examples and labels. Due to the diversity of Chinese expressions, deep semantic understanding of Chinese sentences is needed. Deep learning models are adept at capturing semantic meaningful features. Therefore, present disclosure uses a deep learning model and a Gaussian mixture model (GMM) as a regularizer to accomplish medical query classification with limited labels. Meanwhile, given a large amount of unlabeled data, the present disclosure assists in improving generalization on a supervised task.

SUMMARY

According to some possible implementations, a method includes receiving, by a device, a query including a sequence of words; converting, by the device, the sequence of words into a sequence of feature vectors; generating, by the device and using a bi-directional long-short term memory (LSTM), a semantic meaning of the sequence of feature vectors; and regularizing, by the device and using a Gaussian mixed model (GMM), the LSTM based on the generated semantic meaning of the sequence of feature vectors.

According to some possible implementations, a device comprises at least one memory configured to store program code; and at least one processor configured to read the program code and operate as instructed by the program code, the program code including: receiving code configured to cause the at least one processor to receive a query including a sequence of words; converting code configured to cause the at least one processor to convert the sequence of words into a sequence of feature vectors; generating code configured to cause the at least one processor to generate, using a bi-directional long-short term memory (LSTM), a semantic meaning of the sequence of feature vectors; and regularizing code configured to cause the at least one processor to regularize, using a Gaussian mixed model (GMM), the LSTM based on the generated semantic meaning of the sequence of feature vectors.

According to some possible implementations, a non-transitory computer-readable medium stores instructions, the instructions comprising: one or more instructions that, when executed by one or more processors of a device, cause the one or more processors to: receive a query including a sequence of words; convert the sequence of words into a sequence of feature vectors; generate, using a bi-directional long-short term memory (LSTM), a semantic meaning of the sequence of feature vectors; and regularize, using a Gaussian mixed model (GMM), the LSTM based on the generated semantic meaning of the sequence of feature vectors.

DETAILED DESCRIPTION

Figure 1A:
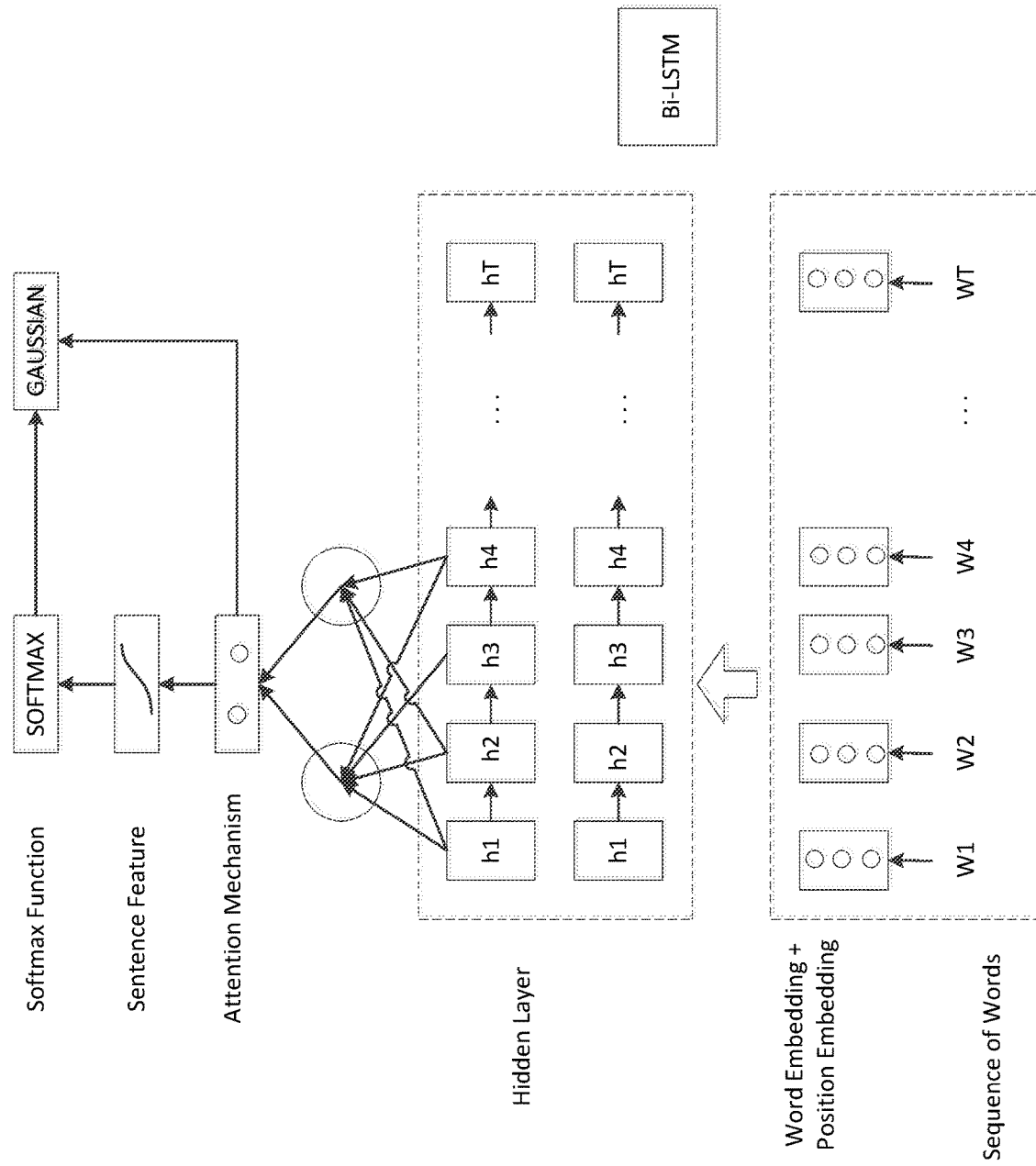
FIGS. 1A and 1B are diagrams of an overview of an example implementation described herein.

In medical chatbot systems, understanding a query intention is the primary step for continuous chatting. Training an accurate query classifier requires domain knowledge and a time-expensive labeling process, especially for knowledge-graph-based question and answer (QA) systems. In addition, understanding the relations between different parts of the query's sentences are important to retrieve intentions. For example, a query "what is the symptom of lung cancer?" is asking about the property of a disease that relates a symptom with a disease through a property relation. The query "what disease could cause fever?" is asking about a disease that causes a symptom, and that relates a symptom with disease through a causal relation. Both of the foregoing queries relate a symptom with a disease, but query intentions are quite different. Determining query intentions is beneficial to retrieve accurate answers from the knowledge graph. Therefore, obtaining the deep representation of the queries and accurately classifying them in the knowledge-graph-based QA based chatbot is important.

The methodology of classifying medical related queries falls into the following two categories: In a rule-based category, a classifier only considers whether a particular set of keywords (or similar words) exists or not in the query. For example, "what is the symptom of fever?" is classified as a disease-symptom query which contains a disease named entity and the symptom word is considered as the keyword. A sentence-level classifier (e.g., an RNN or LSTM) is used to model the sentence feature and convert the sequence of words to a class label.

For the aforementioned two types of methods, the disadvantages are that rule-based systems typically cannot deal with out-of-vocabulary keywords. Second, rule-based approaches typically only relies on a set of keywords that can be not generalized and do not consider the semantic meaning of the whole sentence. Therefore, it often leads to poor performance. For sentence-level classifiers, using RNN/LSTM models can increase performance but often require a vast amount of training data. Even though plain text queries data can be obtained through crowdsourcing, accurately labeling them is expensive and time-consuming.

The present disclosure combines a deep learning method and a semi-supervised learning method that handle the difficulties associated with a lack of labeled data. Accordingly, some implementations herein improve performance of classifiers.

The present disclosure may be used to classify different types of queries in a knowledge-graph-based QA chatbot system. The present disclosure can be also served as a preprocessing step of separating different types of phrases or sentences for events extraction before building a knowledge graph.

The present disclosure provides a system that provides the aforementioned functions by training with a limited labeled data set, and a large unlabeled data set that can be obtained from multiple resources. To capture the deep representation of queries, the present disclosure provides a deep learning model using a bi-directional long-short term memory (LSTM) followed by an attention mechanism. To generalize the supervised model using both limited labeled data and large unlabeled data, the present disclosure includes a Gaussian mixture model (GMM) to model the data distribution.

Referring to FIG. 1A, the present disclosure minimizes $-[\log(p(y|x))+\log(p(x))]$, The classifier $p(y|x)$ is modeled by the bi-directional LSTM followed by the attention mechanism and the softmax layer. The data $p(x)$ is modeled by a Gaussian mixture model.

In a pre-processing step, and as shown in FIG. 1, query sentences are considered as word sequences, and each word is converted into a vector by concatenating word embedding and position embedding.

As further shown in FIG. 1A, a word embedding and position embedding layer converts a word sequence into a sequence of feature vectors, where each feature vector is a concatenation of a word feature and a position feature. A word feature is parameterized by a weight matrix, where its row is indexed by the word location in the dictionary. The positioning feature is the relative position of a word in the sequence.

As further shown in FIG. 1A, a Bi-LSTM layer converts the input feature sequence into an output feature sequence, where the output feature sequence encodes the semantic meaning of the sentence by capturing the dependence relation between the current word and its pre-words or post-words.

As further shown in FIG. 1A, an attention mechanism layer allows the system to pay attention to a particular part of the source sentence. Each attention node captures a different portion of the sentence, while each portion of the sentence is considered as a target named entity (a node in knowledge graph).

As further shown in FIG. 1A, sentence feature vectors are clustered by the GMM. The labeled part of the features are classified based on minimizing a softmax cross entropy loss between the predicted probabilities and a true label.

Figure 1B:
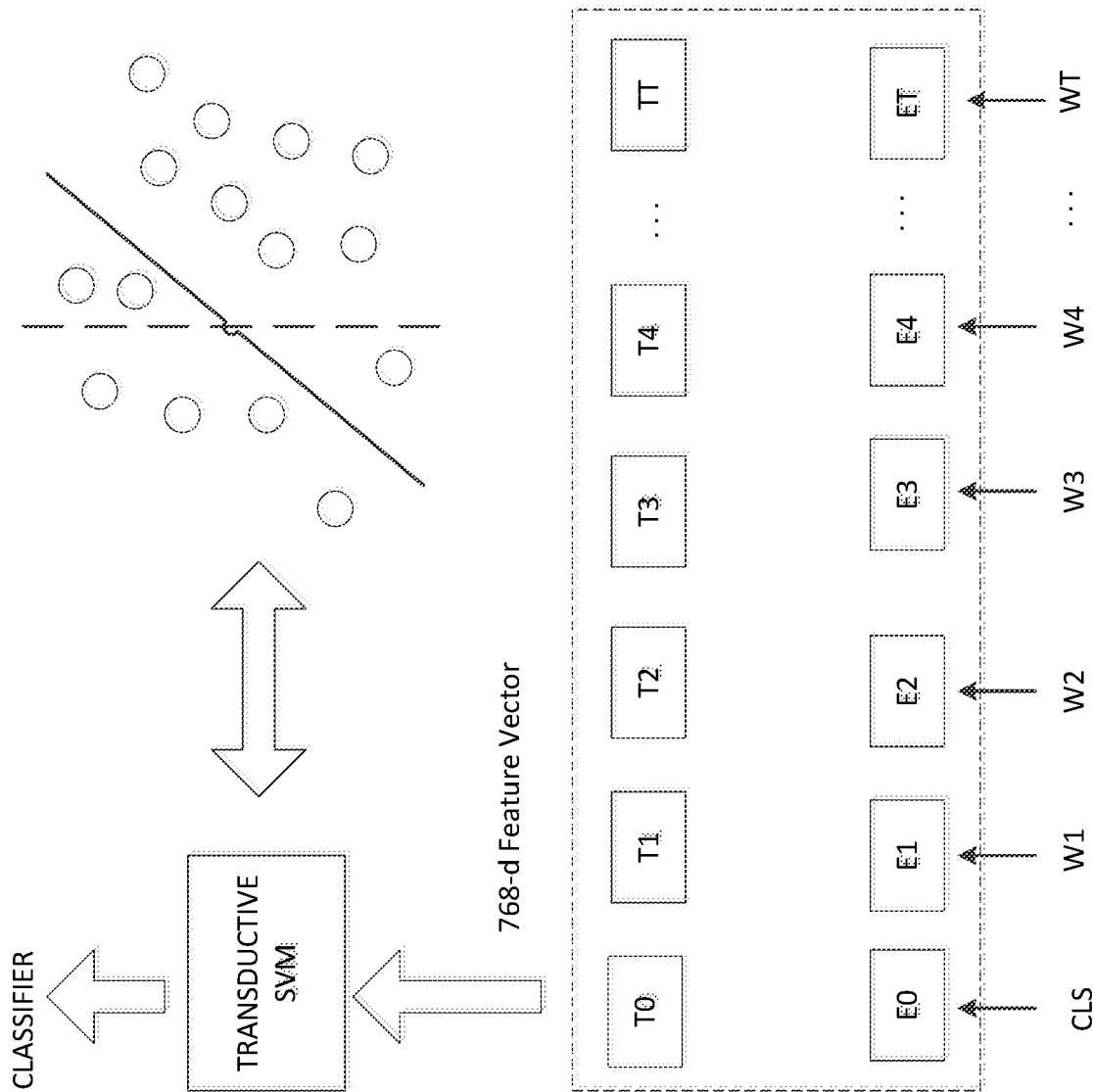

As shown in FIG. 1B, in the training step, the queries are first converted into sentence features using a deep learning model (BERT), then the features are considered as the input to the transductive support vector machine (SVM) model to train a classifier. In the test step, the queries are converted into features and use the learned classifier to obtain their predicted labels.

The model training is performed based on an alternative minimization mechanism, where the deep network parameters are first updated to produce sentence embeddings, then the embedded sentence features are treated as an input of GMM to minimize the negative log-likelihood of the GMM. The process may be repeated again.

The present disclosure utilizes a large amount of web-based data, and can increase query type classification generalization ability and hence increase performance. Further, the present disclosure eases the burden of labeling and preparing large training text queries for deep learning models to work.

Figure 2:
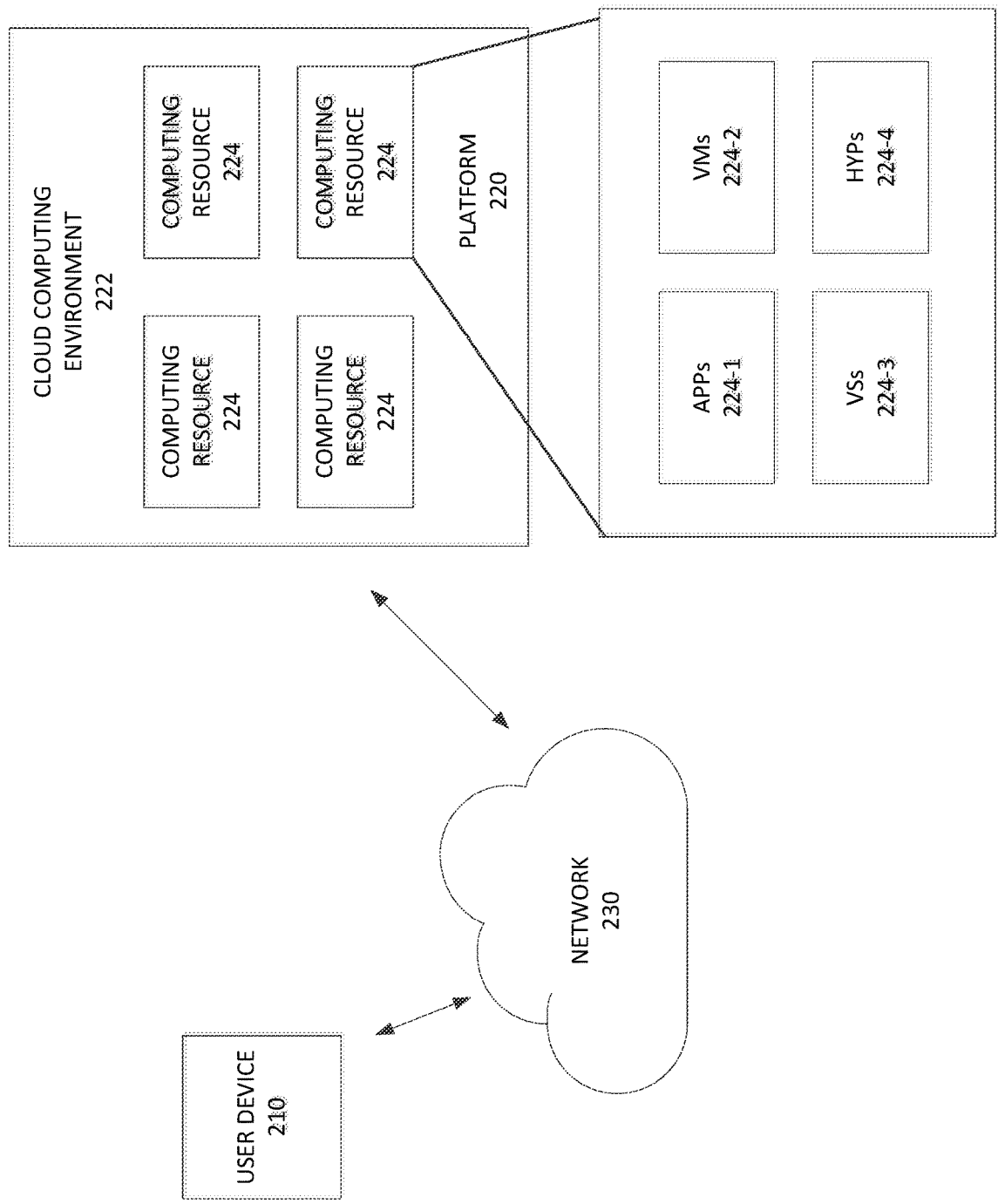
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of training a bi-directional long-short term memory (LSTM) for query identification using a Gaussian mixed model (GMM), as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
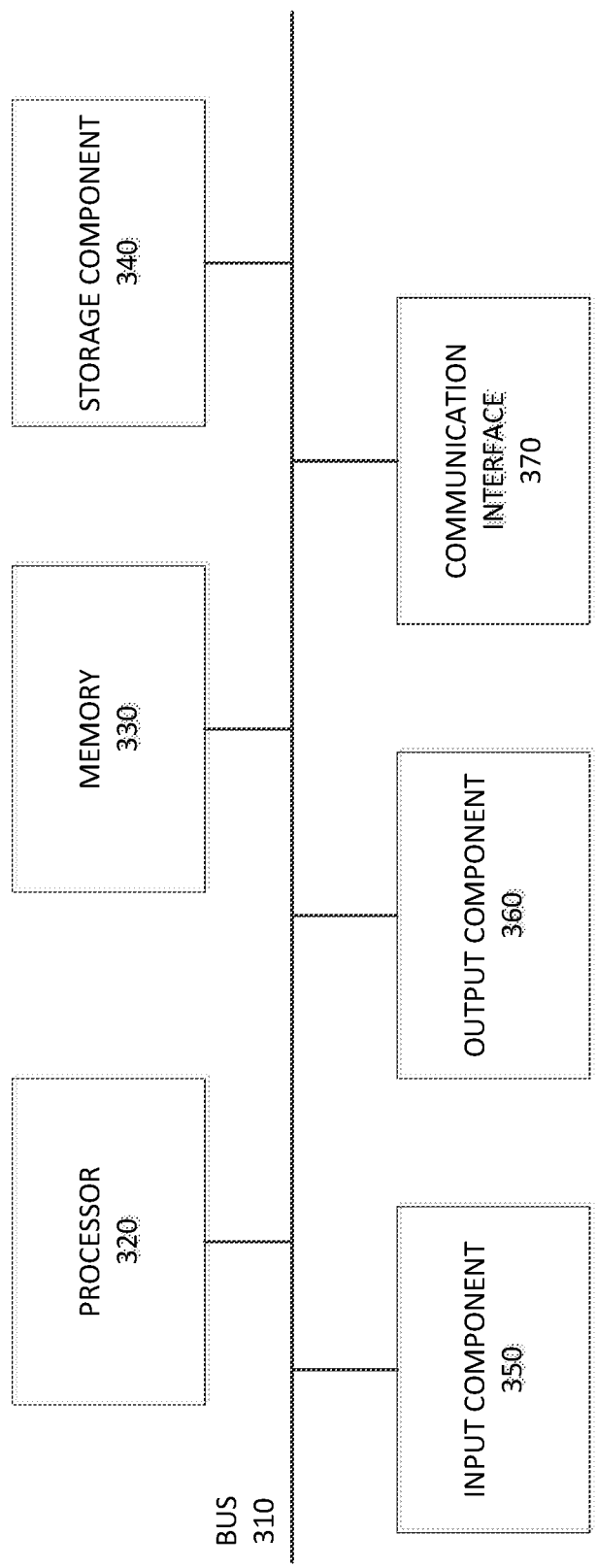
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
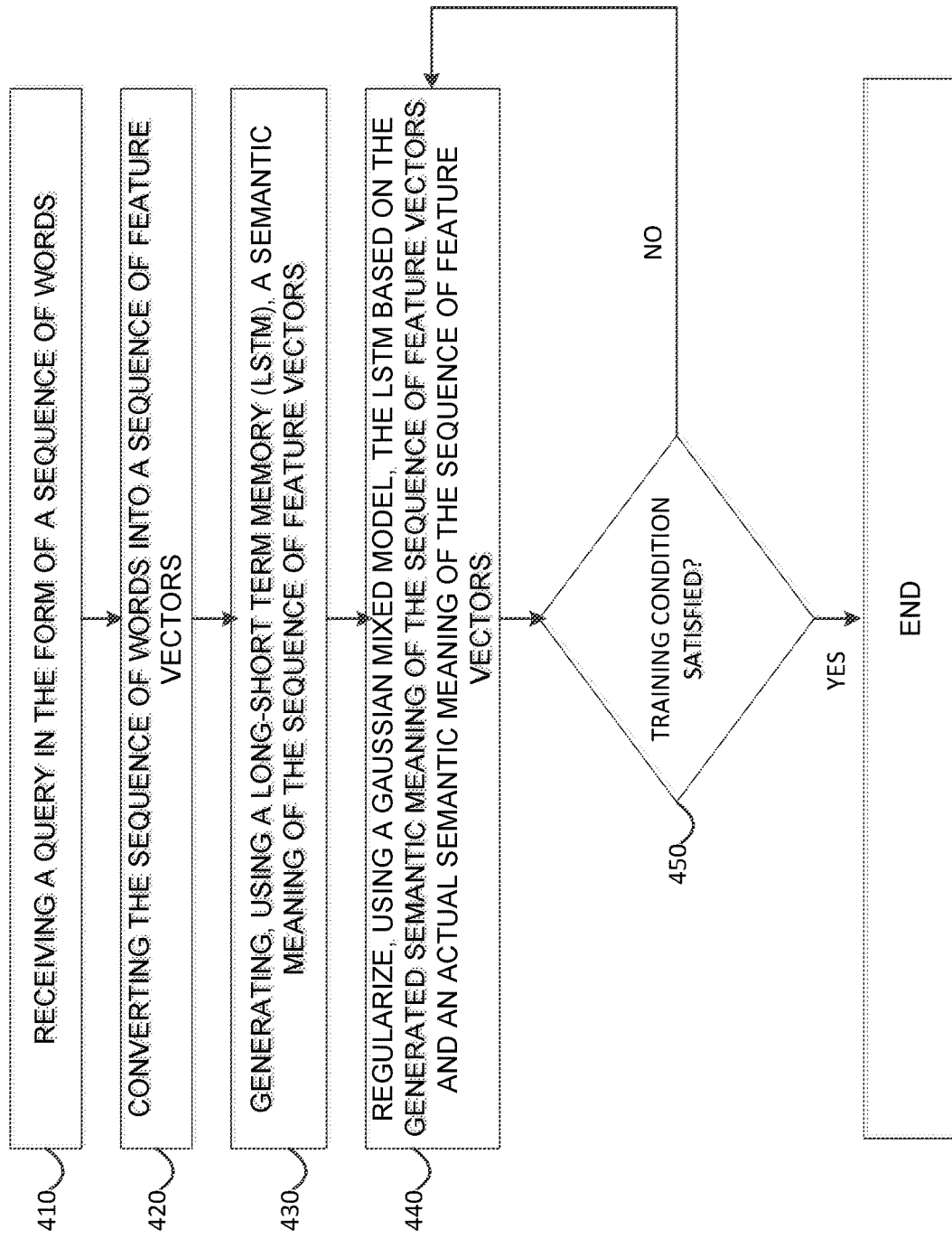
FIG. 4 is a flow chart of an example process for training a bi-directional long-short term memory (LSTM) for query identification using a Gaussian mixed model (GMM).

FIG. 4 is a flow chart of an example process 400 for training a bi-directional long-short term memory (LSTM) for query identification using a Gaussian mixed model (GMM). In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include receiving a query including a sequence of words (block 410). For example, platform 220 may receive a query including a sequence of words in order to identify a semantic meaning of the query.

In some implementations, a query may correspond to a medical based query. For example, a query may include "what are the symptoms of a fever?"

In some implementations, platform 220 may receive an input data set that includes labeled queries. That is, platform 220 may receive an input data set that includes queries that are mapped to semantic meanings. In other words, the labeled queries may be associated with a predefined meaning. In this way, platform 220 may use the labeled queries in order to train the LSTM, as described elsewhere herein.

In some implementations, platform 220 may receive an input data set that includes unlabeled queries. That is, platform 200 may receive an input data set that includes queries that are not mapped to semantic meanings. Platform 220 may use the unlabeled queries for further model refining and training.

In some implementations, platform 220 may receive the input data set from another device, based on performing a web mining technique, based on performing an information retrieval technique, and/or the like.

As further shown in FIG. 4, process 400 may include converting, by the device, the sequence of words into a sequence of feature vectors (block 420).

In some implementations, platform 220 may convert the sequence of words into a sequence of feature vectors based on performing a word embedding technique and a position embedding technique.

For example, platform 220 may perform a word embedding technique that generates a word feature based on a position of the word in a dictionary. Additionally, platform 220 may perform a position embedding technique that generates a position feature based on a position of the word in the query. Additionally, platform 220 may generate a feature vector based on the word feature and the position feature.

As further shown in FIG. 4, process 400 may include generating, by the device and using a bi-directional long-short term memory (LSTM), a semantic meaning of the sequence of feature vectors (block 430). For example, platform 220 may use an LSTM to generate a semantic meaning of the sequence of feature vectors.

In some implementations, the semantic meaning may correspond to a meaning, an intent, etc. of the query. The semantic meaning may be designated by a value, a label, a designation, and/or the like.

In some implementations, platform 220 may input the sequence of feature vectors into the LSTM. The LSTM may receive the sequence of feature vectors, and may generate a semantic meaning as an output.

In some implementations, the LSTM may include a set of parameters that permits that LSTM to generate a semantic meaning based on an input sequence of feature vectors. The platform 220 may cause the set of parameters to be adjusted, as described below.

As further shown in FIG. 4, process 400 may include regularizing, by the device and using a Gaussian mixed model (GMM), the LSTM based on the generated semantic meaning of the sequence of feature vectors (block 440).

For example, platform 220 may regularize the LSTM by adjusting the set of parameters of the LSTM.

In some implementations, platform 220 may regularize the LSTM by using an attention mechanism that pays attention to a particular part of the source sentence. Each attention node captures a different portion of the sentence, while each portion of the sentence is considered as a target named entity (a node in knowledge graph).

Additionally, or alternatively, platform 220 may regularize the LSTM by using a loss minimization with regularization technique. For example, all sentence feature vectors are clustered by the GMM. The labeled part of the features are classified based on minimizing a softmax cross entropy loss between the predicted probabilities and true labels.

Platform 220 may regularize the LSTM based on an alternative minimization mechanism, where the deep network parameters of the LSTM are first updated to produce sentence embeddings, then all the embedded sentence features are treated as an input of GMM to minimize the negative log-likelihood of the GMM.

As further shown in FIG. 4, process 400 may include determining whether a training condition is satisfied (block 450). For instance, the training condition may correspond to a threshold number of iterations of regularizing the LSTM, a threshold number of iterations of updating the parameters of the LSTM, a threshold amount of time, a threshold model accuracy being reached, or the like.

If the training condition is not satisfied, then process 400 may include performing step 400. If the training condition is satisfied, then process 400 may end.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a query including a sequence of words;
   converting, by the device, the sequence of words into a sequence of feature vectors;
   generating, by the device and using a bi-directional long-short term memory (LSTM) followed by an attention mechanism and a softmax layer, a semantic meaning of the sequence of feature vectors; and
   regularizing, by the device and using a Gaussian mixed model (GMM), the LSTM based on the generated semantic meaning of the sequence of feature vectors,
   wherein the regularizing the LSTM comprises classifying, by the GMM, labeled parts of the feature vectors based on minimizing a softmax cross entropy loss between predicted probabilities and true labels, and minimizing a negative log likelihood of the GMM.

2. The method of claim 1, wherein the converting includes at least one of a concatenating technique, a word embedding technique, and a position embedding technique.

3. The method of claim 1, wherein each feature vector of the sequence of feature vectors is a concatenation of a word feature and a position feature.

4. The method of claim 3, wherein the word feature corresponds to location of a word in a dictionary, and wherein the position feature corresponds to a position of the word in the sequence of words.

5. The method of claim 1, wherein the generating comprises generating the semantic meaning based on a relationship between the words of the sequence of words.

6. The method of claim 1, further comprising training the GMM by using an attention mechanism layer.

7. A device, comprising:
   at least one memory configured to store program code;
   at least one processor configured to read the program code and operate as instructed by the program code, the program code including:
      receiving code configured to cause the at least one processor to receive a query including a sequence of words;
      converting code configured to cause the at least one processor to convert the sequence of words into a sequence of feature vectors;
      generating code configured to cause the at least one processor to generate, using a bi-directional long-short term memory (LSTM) followed by an attention mechanism and a softmax layer, a semantic meaning of the sequence of feature vectors; and
      regularizing code configured to cause the at least one processor to regularize, using a Gaussian mixed model (GMM), the LSTM based on the generated semantic meaning of the sequence of feature vectors,
   wherein the regularizing code is configured to cause the at least one processor to regularize the LSTM by classifying, by the GMM, labeled parts of the feature vectors based on minimizing a softmax cross entropy loss between predicted probabilities and true labels, and minimizing a negative log likelihood of the GMM.

8. The device of claim 7, wherein the converting code is further configured to cause the at least one processor to convert the sequence of words using at least one of a concatenating technique, a word embedding technique, and a position embedding technique.

9. The device of claim 7, wherein each feature vector of the sequence of feature vectors is a concatenation of a word feature and a position feature.

10. The device of claim 9, wherein the word feature corresponds to location of a word in a dictionary, and wherein the position feature corresponds to a position of the word in the sequence of words.

11. The device of claim 7, wherein the generating code is further configured to cause the at least one processor to generate the semantic meaning based on a relationship between the words of the sequence of words.

12. The device of claim 7, further comprising:
   training code configured to cause the at least one processor to train the GMM using an attention mechanism layer.

13. A non-transitory computer-readable medium storing instructions, the instructions comprising: one or more instructions that, when executed by one or more processors of a device, cause the one or more processors to:
   receive a query including a sequence of words;
   convert the sequence of words into a sequence of feature vectors;
   generate, using a bi-directional long-short term memory (LSTM) followed by an attention mechanism and a softmax layer, a semantic meaning of the sequence of feature vectors; and
   regularize, using a Gaussian mixed model (GMM), the LSTM based on the generated semantic meaning of the sequence of feature vectors,
   wherein the one or more processors of the device are caused to regularize the LSTM by classifying, by the GMM, labeled parts of the feature vectors based on minimizing a softmax cross entropy loss between predicted probabilities and true labels, and minimizing a negative log likelihood of the GMM.

14. The non-transitory computer-readable medium of claim 13, wherein the converting includes at least one of a concatenating technique, a word embedding technique, and a position embedding technique.

15. The non-transitory computer-readable medium of claim 13, wherein each feature vector of the sequence of feature vectors is a concatenation of a word feature and a position feature.

16. The non-transitory computer-readable medium of claim 15, wherein the word feature corresponds to location of a word in a dictionary, and wherein the position feature corresponds to a position of the word in the sequence of words.

17. The non-transitory computer-readable medium of claim 13, wherein the one or more instructions cause the one or more processors to generate the semantic meaning based on a relationship between the words of the sequence of words.

18. The non-transitory computer-readable medium of claim 13, wherein the one or more instructions further cause the one or more processors to train the GMM by using an attention mechanism layer.

* * * * *